United States Patent [19]

Choi

[11] Patent Number: 5,990,970
[45] Date of Patent: Nov. 23, 1999

[54] METHOD OF CONTROLLING SCREEN SIZE OF WIDE DISPLAY MONITOR

[75] Inventor: Chun-geun Choi, Suwon-si, Rep. of Korea

[73] Assignee: SamSung Electronics Co., Ltd., Suwon, Rep. of Korea

[21] Appl. No.: 09/075,934

[22] Filed: May 12, 1998

[30] Foreign Application Priority Data

May 12, 1997 [KR] Rep. of Korea ...................... 97-18177

[51] Int. Cl.⁶ ...................................... H04N 5/46
[52] U.S. Cl. ........................ 348/556; 348/445; 348/581
[58] Field of Search ................... 348/445, 556, 348/559, 704, 581, 558, 555, 913, 542, 543, 806, 807, 745; 345/127, 131, 132, 439

[56] References Cited

U.S. PATENT DOCUMENTS

| | | | |
|---|---|---|---|
| 5,303,044 | 4/1994 | Richards | 348/445 |
| 5,329,369 | 7/1994 | Willis et al. | 348/556 |
| 5,614,956 | 3/1997 | Matsuura | 348/556 |
| 5,642,167 | 6/1997 | Wallace et al. | 348/420 |
| 5,686,969 | 11/1997 | Baik | 348/556 |
| 5,699,123 | 12/1997 | Ebihara et al. | 348/445 |

*Primary Examiner*—Andrew I. Faile
*Assistant Examiner*—Habte Bahgi
*Attorney, Agent, or Firm*—Robert E. Bushnell, Esq.

[57] ABSTRACT

Controlling the screen size of a wide display monitor, by which the screen size can be regulated by the user's pressing a key such that the screen is maintained stable according to the switching of wide view mode and/or expanded view mode, wherein a display mode and a DAC level dependent upon the display mode are selected. It is then checked to make sure that the DAC level is entered, when the display mode and the DAC level are entered. Then the DAC levels of horizontal and vertical sizes are calculated, and the screen size is controlled according to the calculated DAC levels of the horizontal and vertical sizes.

19 Claims, 5 Drawing Sheets

METHOD OF CONTROLLING SCREEN SIZE OF WIDE DISPLAY MONITOR

CLAIM OF PRIORITY

This application makes reference to, incorporates the same herein, and claims all benefits accruing under 35 U.S.C § 119 from an application entitled Method Of Controlling Screen Size Of Wide Display Monitor earlier filed in the Korean Industrial Property Office on May 12, 1997, and there duly assigned Serial No. 97-18177 by that Office.

BACKGROUND OF THE INVENTION

1. Field of the Invention

The present invention relates to a method of controlling the screen size of a wide display monitor and, more particularly, to a method of controlling the screen size of a wide display monitor in combination with the wide or expanded mode irrespective of the mode selected.

2. Discussion of Related Art

Recently, computers have been equipped with a variety of functions as audio, television or game machine in addition to a calculator which is used only for simple arithmetical operation or comparison. These computers are called multimedia computers and are sometimes used as replacements for the other electronic products such as audio, television and game machine.

As these multimedia computers of high data-processing rate have been developed, the functions of the display monitor for displaying the data generated from the computer as a visual image are very significant to the users. The most important factors are especially the image quality and screen size of the display monitor.

In the normal operation of the display monitor a S-character compensating signal generated from a microcomputer, for example, is applied to an S-character compensating circuit which controls a horizontal output circuit in order to compensate for a screen that has been expanded.

Such a exemplary display monitor having various functions for compensating for image distortion has been developed to produce images of good quality and enlarge the size of the screen of a CRT for the user's convenience.

Recently, users are requesting display monitors that have a large-sized screen in order to display a vivid image of good quality with development of the multimedia culture. The most preferred display monitor is a wide display monitor having the wide screen size ratio of 4:3 or 16:9 in width× height.

The user can regulate the screen size of such a wide display monitor. Conventionally, the screen size mode is executed with a simple arithmetic operation in regulating the screen size. When the expanded mode or the wide mode is on with the maximum screen size, or off with the minimum screen size, the screen size is hardly changed. Where the expanded mode or the wide mode is off with the screen size being maximum or minimum, the screen size cannot return to the previous state.

SUMMARY OF THE INVENTION

Accordingly, the present invention is directed to a method of controlling the screen size of a wide display monitor that substantially obviates one or more of the problems due to limitations and disadvantages of the related art.

An object of the present invention is to provide a method of controlling the screen size of a wide display monitor, wherein the screen size is divided into digital-to-analog convertor (DAC) levels and thereby controlled according to the mode even in the case the expanded mode or the wide mode is combined with the current mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of controlling the screen size of a wide display monitor includes the steps of: (a) when a display mode and a DAC level dependent upon the display mode are selected, checking whether the DAC level is entered; (b) when the display mode and the DAC level are entered, calculating the DAC levels of horizontal and vertical sizes; and (c) activating the display mode displayed according to the DAC levels of the horizontal and vertical sizes calculated.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
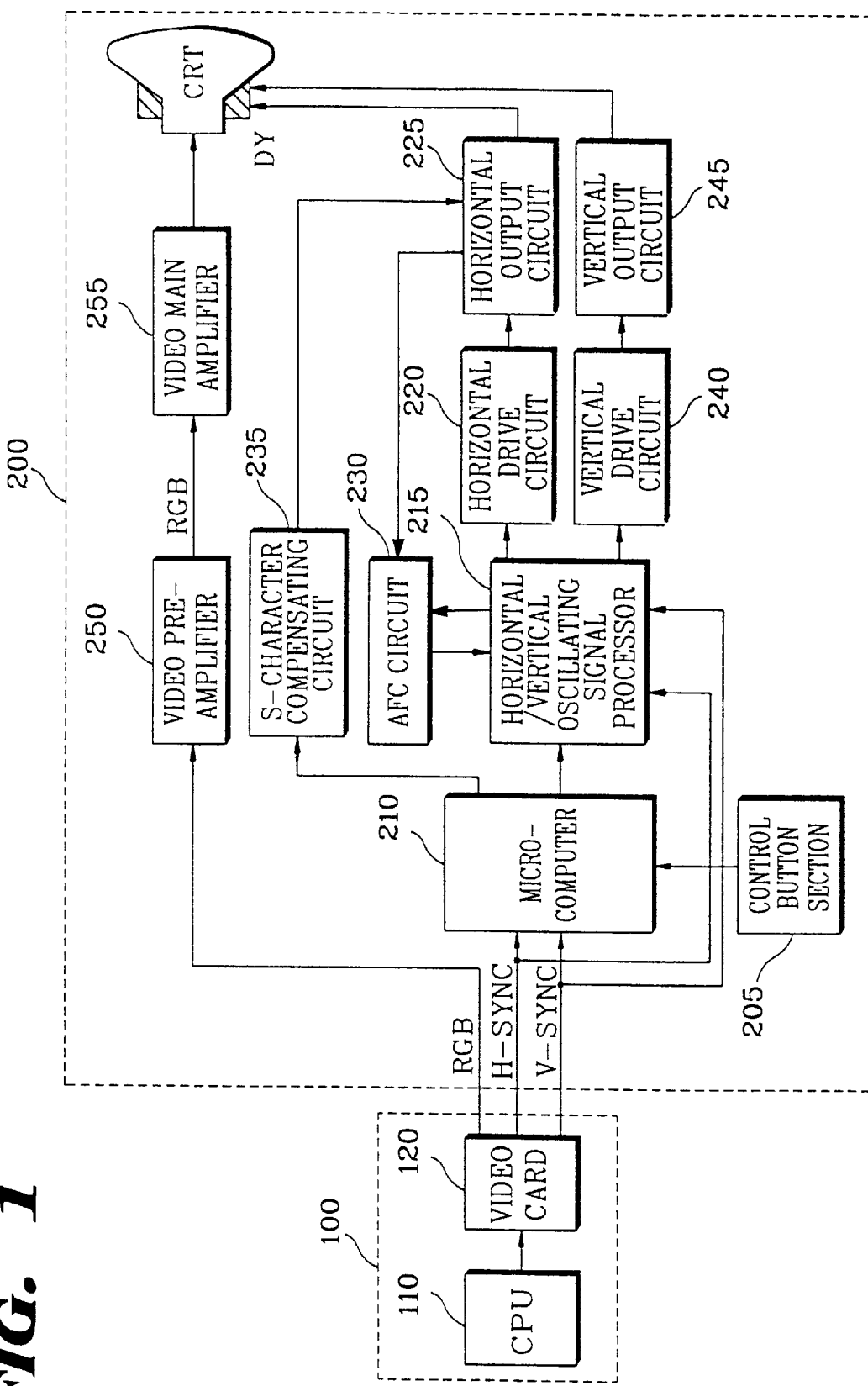
FIG. 1 is a block diagram of the internal circuit of a exemplary display monitor.

FIG. 1 is a block diagram of the internal circuit of a exemplary display monitor. As shown in FIG. 1 a computer 100 is composed of a central processing unit (CPU) 110; and a video card 120 for processing the output data received from the CPU 110 into red, green and blue (RGB) picture signals, and generating horizontal sync signals and vertical sync signals, H-SYNC and V-SYNC, for synchronizing the RGB picture signals.

Display monitor 200 which processes the RGB picture signals received from the video card 120 in the computer 100 into a visual image is composed of: a control button section 205 for generating a key signal to regulate the image and function displayed on the screen of the display monitor; a microcomputer 210 receptive to the key signal from the control button section 205 to control the display monitor 200 according to the selected function, and receptive to the horizontal sync signals and vertical sync signals, H-SYNC and V-SYNC, from the video card 120 to discriminate the resolution and frequency mode of the RGB picture signals, generating a reference oscillating signal; a horizontal and vertical oscillating signal processor 215 receptive to the reference oscillating signal from the microcomputer 210 and the horizontal sync signals and vertical sync signals, H-SYNC and V-SYNC, from the video card 120, compensating for the linearity and frequency band to generate horizontal and vertical oscillating pulses; a horizontal drive circuit 220 for generating a drive current in response to the horizontal oscillating pulse generated from the horizontal and vertical oscillating signal processor 215; a horizontal output circuit 225 for switching the drive current received from the horizontal drive circuit 220 to generate a horizontal saw-tooth current to be applied to a deflection yoke DY; an AFC (Automatic Frequency Control) circuit 230 for detecting the phase difference between the horizontal oscillating pulse received from the horizontal and vertical oscillating signal processor 215 and the horizontal sync pulse received from the horizontal output circuit 225, and controlling the horizontal oscillating frequency according to the detected phase difference; an S-character compensating circuit 235 for applying an S-character compensating signal received from the microcomputer 210 to the horizontal output circuit 225 to compensate for the distortion of an image displayed on the screen of the display monitor 200; a vertical drive circuit 240 receptive to the vertical oscillating pulse from the horizontal and vertical oscillating signal processor 215, generating a drive current; a vertical output circuit 245 receptive to the drive current generated from the vertical drive circuit 240, generating a vertical saw-tooth current to be applied to the deflection yoke DY; a video pre-amplifier 250 for boosting the RGB picture signals received from the video card 120 to a specified level; and a video main amplifier 255 for further boosting the RGB picture signals sent from the video pre-amplifier 250 and sending them to a CRT.

Below is a further detailed description of the data processing operation of the display monitor 200 as constructed above.

Video card 120 processes the data received from the CPU 110 in the computer 100, generating RGB picture signals, horizontal sync signals H-SYNC and vertical sync signals V-SYNC, for synchronizing the RGB picture signals.

Upon receipt of the RGB picture signals and the horizontal sync signals and vertical sync signals, H-SYNC and V-SYNC, from the video card 120, the display monitor 200 discriminates the resolution and frequency of the RGB picture signals, generating a reference oscillating signal. At this stage, the key signal generated from the control button section 205 is sent to the microcomputer 210, which controls the functions of the display monitor 200 in response to the key signal, or if the key signal is a screen adjusting signal, overlaps the reference oscillating signal with the gain of the screen adjusting signal.

Horizontal and vertical oscillating signal processor 215 receives the reference oscillating signal generated from the microcomputer 210 and compensates for the frequency band of the horizontal sync signals and vertical sync signals, H-SYNC and V-SYNC, received from the video card 120, improving the linearity. Then, the horizontal and vertical oscillating signal processor 215 generates horizontal and vertical oscillating pulses.

Horizontal drive circuit 220 receives the horizontal oscillating pulse from the horizontal and vertical oscillating signal processor 215, supplying a drive current to switch the horizontal output circuit 225. The horizontal output circuit 225 is switched in accordance with the drive current applied from the horizontal drive circuit 220 and generates a horizontal saw-tooth current to be applied to the deflection yoke DY.

Additionally, vertical drive circuit 240 receives the vertical oscillating pulse from the horizontal and vertical oscillating signal processor 215 to drive vertical output circuit 245. The vertical output circuit 245 driven by the vertical drive circuit 240 generates a vertical saw-tooth current to be applied to the deflection yoke DY.

The horizontal and vertical saw-tooth currents sent to the deflection yoke DY determine the scanning period of the image displayed through the CRT. In this case, the RGB picture signals generated from the video card 120 are boosted through the video pre-amplifier 250 and the video main amplifier 255.

In the normal operation of the display monitor 200 as constructed above, AFC circuit 230 detects the phase difference between the oscillating pulse generated from the horizontal and vertical oscillating signal processor 215 and the synchronous pulse which is the horizontal saw-tooth current generated from the horizontal output circuit 225. Passing through the AFC circuit 230, the synchronous signal generated from the horizontal output circuit 255 is controlled to be in synchronization with the pulse sent from the horizontal and vertical oscillating signal processor 215 according to the phase difference.

Further, an S-character compensating signal generated from the microcomputer 210 is applied to the S-character compensating circuit 235, which controls the horizontal output circuit 225, compensating for the screen that has been expanded on the left and right sides than the center thereof.

Such a exemplary display monitor 200 having various functions for compensating for image distortion has been developed to produce images of good quality and enlarge the size of the screen of the CRT for the user's convenience.

Figure 2:
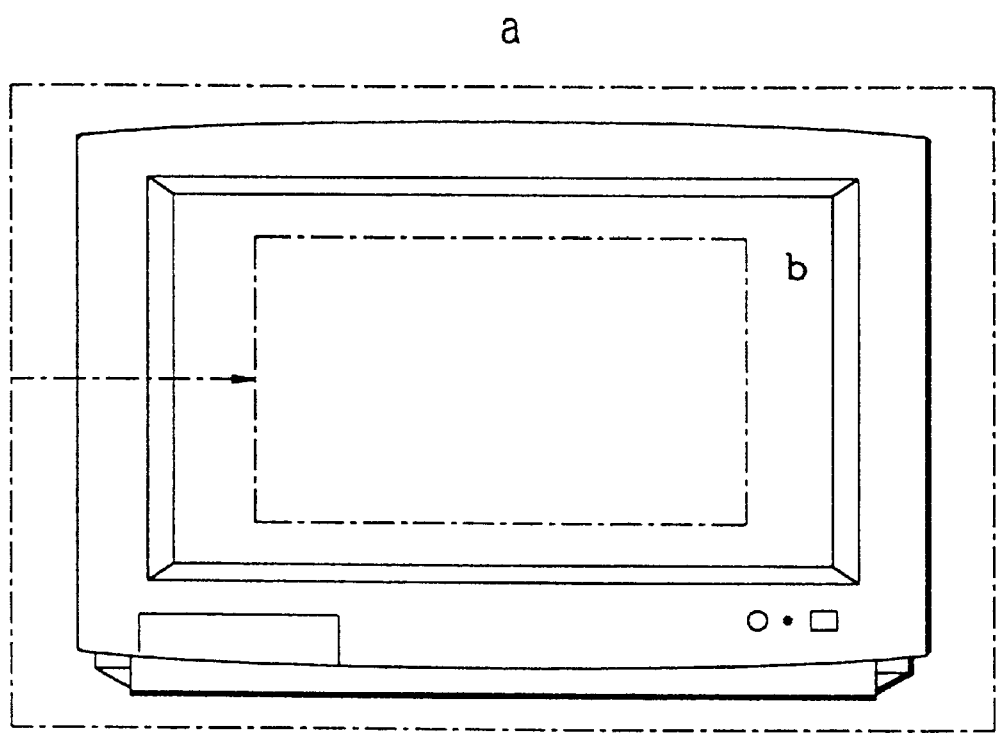
FIG. 2 illustrates the control of the screen size displayed in a wide display monitor.

Recently, users are requesting display monitors that have a large-sized screen in order to display a vivid image of good quality with development of the multimedia culture. The most preferred display monitor is a wide display monitor having the wide screen size ratio of 4:3 or 16:9 in width× height, as shown in FIG. 2.

The user can regulate the screen size of such a wide display monitor. Conventionally, the screen size mode is executed with a simple arithmetic operation as illustrated in FIG. 2 in regulating the screen size. Once the expanded mode or the wide mode is OFF with the screen size "a" which is the maximum screen size, the user cannot resume the screen size to the previous one "b" on occasion.

That is, when the expanded mode or the wide mode is ON with the maximum screen size, or OFF with the minimum screen size, the screen size is hardly changed. Where the expanded mode or the wide mode is OFF with the screen size being maximum or minimum, the screen size cannot return to the previous state.

Figure 3:
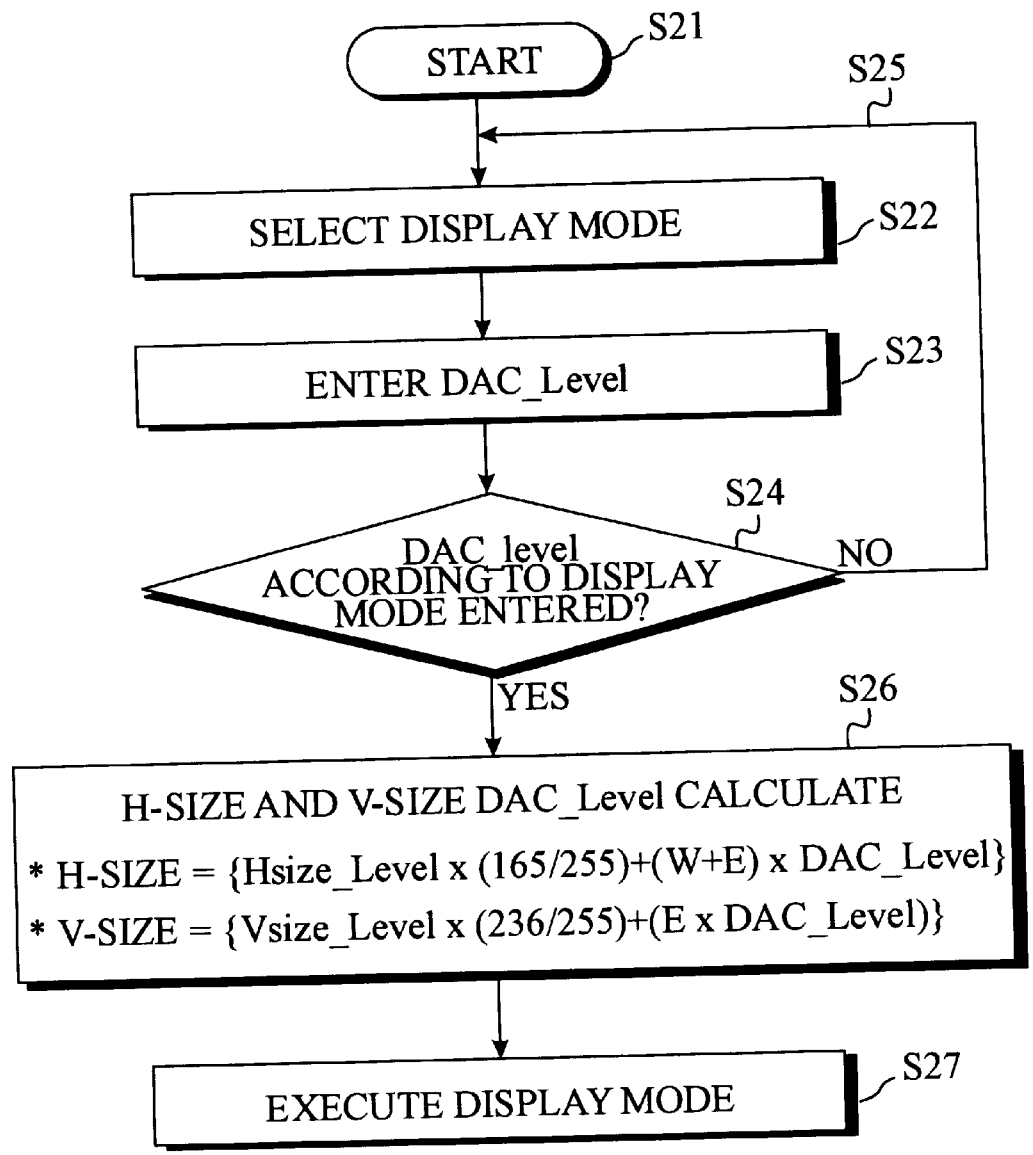
FIG. 3 is a flow chart illustrating a method of controlling the screen size of a wide display monitor in accordance with the present invention.

FIG. 3 is a flow chart illustrating a method of controlling the screen size of a wide display monitor in accordance with the present invention.

As shown in FIG. 3, the method includes the steps of: (S21) determining whether to select a displaymode; (S22) selecting the displaymode; (S23) applying a DAC level to the DAC according to the selected display mode; (S24) checking the receipt of the display mode and the DAC input level; (S25) when the display mode and the DAC level have not been received in step (S24), returning to step (S22); (S26) when the display mode and the DAC level have been received in step (S24), calculating the DAC level of horizontal and vertical sizes, H-SIZE and V-SIZE; and (S27) displaying an image on the screen of the display monitor according to the calculated horizontal and vertical sizes, H-SIZE and V-SIZE.

Figure 4:
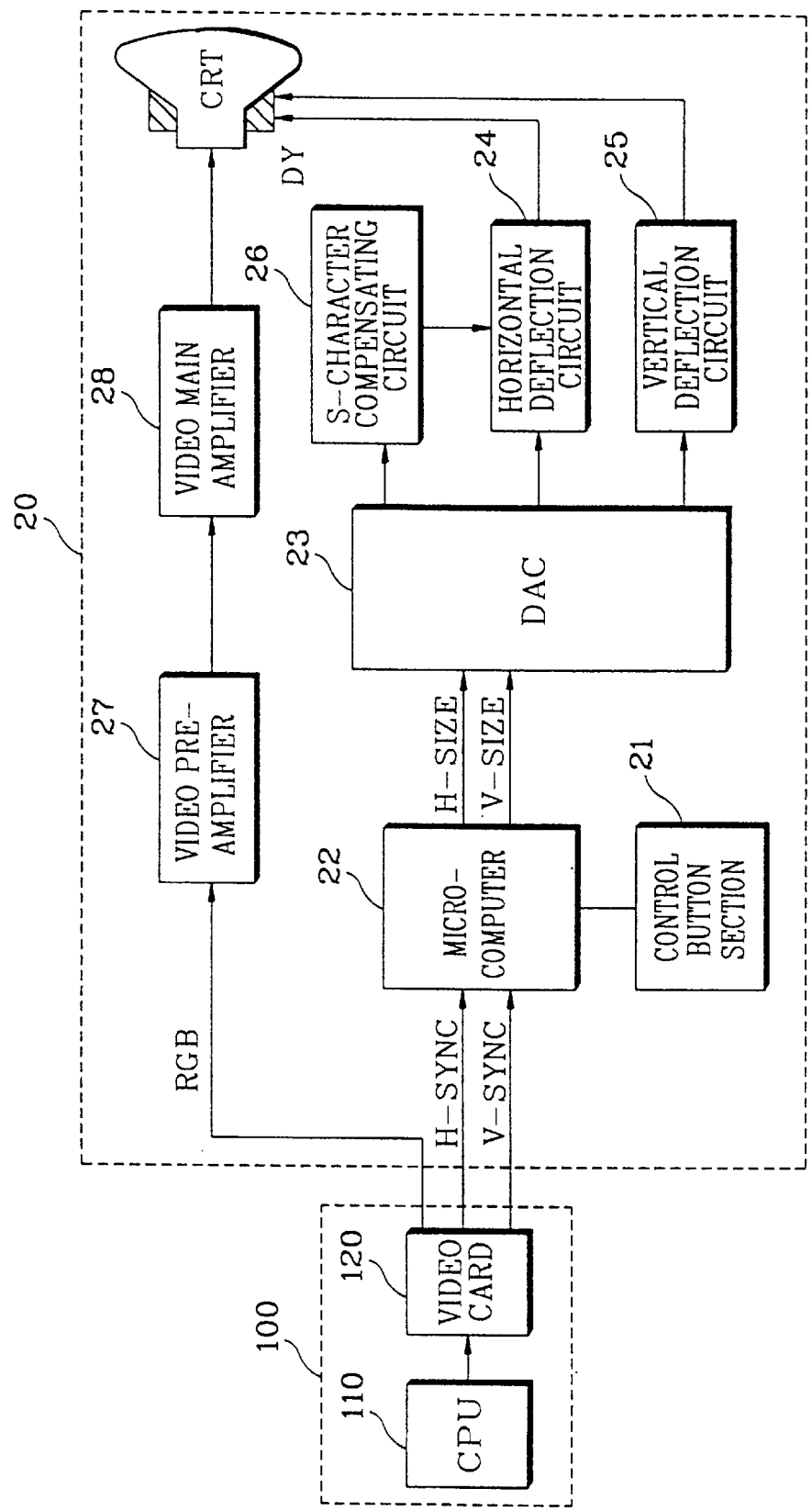
FIG. 4 is a block diagram of the internal circuit of a wide display monitor according to the present invention.

The operation of the wide display monitor in controlling the screen size may be described as follows in connection with FIG. 4.

The data generated from a CPU 11 of a computer 10 is first applied to a video card 12, which processes the data and generates RGB picture signals, horizontal sync signals H-SYNC and vertical sync signals V-SYNC. The RGB picture signals are boosted to a specified level by a video pre-amplifier 27, and further amplified by a video main amplifier 28, and applied to a CRT, which determines the scanning period of the RGB picture signals according to the periods of the horizontal and vertical saw-tooth current flowing through a deflection yoke DY.

The periods of the horizontal and vertical saw-tooth current are generally dependent on those of the horizontal sync signals and vertical sync signals, H-SYNC and V-SYNC, generated from the video card 12 of the computer 10. Microcomputer 22 receives the horizontal sync signals and vertical sync signals, H-SYNC and V-SYNC, and discriminates information, i.e., resolution or frequency, relating to the RGB picture signals generated from the video card 12.

After analysis for the RGB picture signals, the microcomputer 22 generates horizontal and vertical oscillating pulses corresponding to the horizontal sync signals and vertical sync signals, H-SYNC and V-SYNC. The generated horizontal and vertical oscillating pulses are converted to analog signals at DAC 23 and sent to horizontal and vertical deflection circuits 24 and 25.

The horizontal deflection circuit 24 is switched in response to the analog horizontal oscillating pulse from the DAC 23, generating a horizontal saw-tooth current for deflection yoke DY and determining a horizontal scanning period. Further, the vertical deflection circuit 25 is switched in response to the analog vertical oscillating pulse from the DAC 23 and generates a vertical saw-tooth current for deflection yoke DY, determining a vertical scanning period.

The user can change the display mode during the general display operation for displaying an image through the CRT according to the periods of the horizontal and vertical saw-tooth currents sent to the deflection yoke DY from the horizontal and vertical deflection circuits 24 and 25. The change in the display mode is controlled by the control program having the screen size controlling algorithm stored in the microcomputer 22.

The display modes are functions for controlling the screen size as listed in Table 1.

TABLE 1

|  | EXPANDED ON | EXPANDED OFF |
| --- | --- | --- |
| WIDE ON | 90–255 | 70–235 |
| WIDE OFF | 20–185 | 0–165 |

Referring to Table 1, the display modes are divided into the wide view mode WIDE and the expanded view mode EXPANDED, which are displayed simultaneously or separately in the functions for controlling the screen size.

As shown in Table 1, there are all four display modes: a first display mode wherein the wide view mode WIDE and the expanded view mode EXPANDED are both off at the same time; a second display mode wherein the wide view mode WIDE is off and the expanded view mode EXPANDED is on; a third display mode wherein the wide view mode WIDE is o n and the expanded view mode EXPANDED is off; and a fourth display mode wherein the wide view mode WIDE and the expanded view mode EXPANDED are both on simultaneously.

In this case, the DAC input level for controlling the screen size in the range of 0 to 165 in the first display mode, 70 to 235 in the second display mode, 20 to 185 in the third display mode, and 90 to 255 in the fourth display mode.

Accordingly, the user can select a wanted display mode by use of the control button section in order to control the screen size, as shown in Table 1. The switch (not shown) for selecting the display mode in control button section 21 is predetermined and used in step S21 of determining whether to select a display mode.

Once the switch is pressed to change the display mode in step S21, the user selects one of the first to fourth display modes in step S22 and the DAC level DAC_Level of the selected display mode is entered in step S23. Then, the receipt of the DAC level DAC_Level of the selected display mode is checked in step S24.

If the DAC level DAC_Level of the display mode is not received as the user wants, the process returns to step S22 for waiting to the selection of a wanted display mode and the receipt of the DAC level DAC_Level according to the selected display mode, in step S25.

On the contrary, under the receipt of the DAC level DAC_Level according to the display mode, horizontal and vertical sizes, H-SIZE and V-SIZE, are calculated in response to the DAC level DAC_Level, in step S26.

The horizontal and vertical sizes, H-SIZE and V-SIZE, are given by the following expressions;

$$H\text{-SIZE} = H\text{size\_Level} \times (165/255) + (W+E) \times DAC\_Level$$

$$V\text{-SIZE} = V\text{size\_Level} \times (236/255) + (E \times DAC\_Level)$$

where, Hsize_Level is 0 to 255, Vsize_Level is 0 to 255, W is 0 or 1, and E is 0 or 1.

Hsize_Level is determined depending on the selected display mode, and "W" represents the wide view mode WIDE, "E" representing the expanded mode EXPANDED. "0" means that the wide view mode WIDE or the expanded view EXPANDED is OFF, while "1" means that the mode is ON.

The data input to calculate the horizontal and vertical sizes, H-SIZE and V-SIZE, is entered according to the display mode selected, as listed in Table 2.

TABLE 2

|  | INPUT DATA | |
| --- | --- | --- |
| DISPLAY MODE | (W,E) | DAC_Level |
| FIRST DISPLAY MODE | (0,0) | 0–165 |
| SECOND DISPLAY MODE | (0,1) | 70–235 |
| THIRD DISPLAY MODE | (1,0) | 20–185 |
| FOURTH DISPLAY MODE | (1,1) | 90–255 |

For example, once the first display mode is selected, W and E are both "0" and Hsize_Level ranges from 0 to 255, Vsize_Level ranges from 0 to 255 and DAC_Level ranges from 0 to 165 in the above equations. The input levels of the Hsize_Level, Vsize_Level and DAC_Level can be increased or decreased step by step in their given ranges, respectively, in response to the switch signal generated from control button section 21 by the algorithm of the screen size control program.

When the levels of horizontal and vertical sizes, H-SIZE and V-SIZE, are determined depending on the selected display mode, they are displayed on the screen in step S27. That is, the horizontal and vertical sizes, H-SIZE and V-SIZE, calculated step by step according to the program stored in the microcomputer 22 are converted to analog signals through DAC 23 and applied to horizontal and vertical deflection circuits 24 and 25 and S-character compensating circuit 26.

Horizontal and vertical deflection circuits 24 and 25 and S-character compensating circuit 26 compensate for the image distortion according to the levels of the horizontal and vertical sizes, H-SIZE and V-SIZE, generating a saw-tooth current to the deflection yoke DY to enlarge or reduce the size of the screen.

Figure 5:
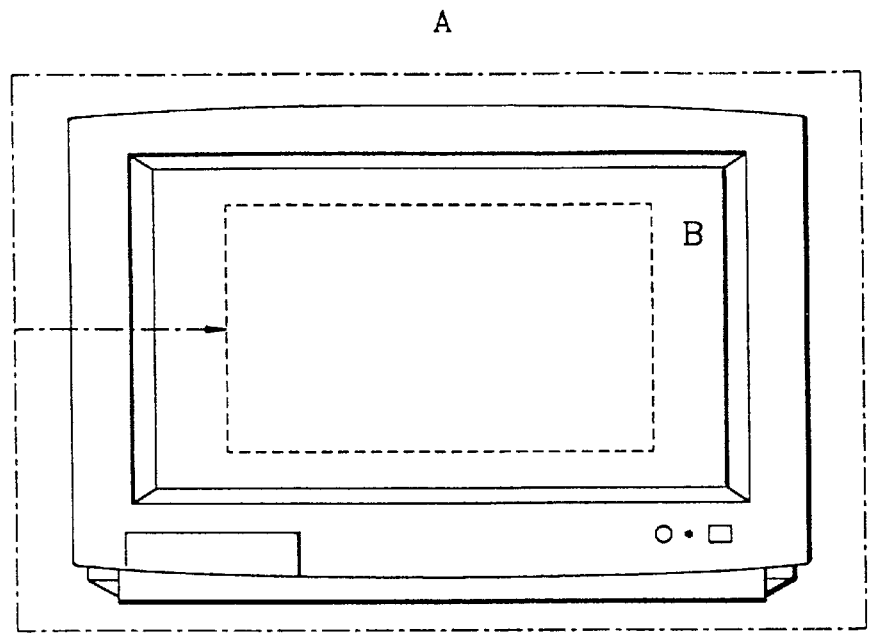
FIG. 5 illustrates the reduction of the maximum screen size in accordance with the present invention.
Figure 6:
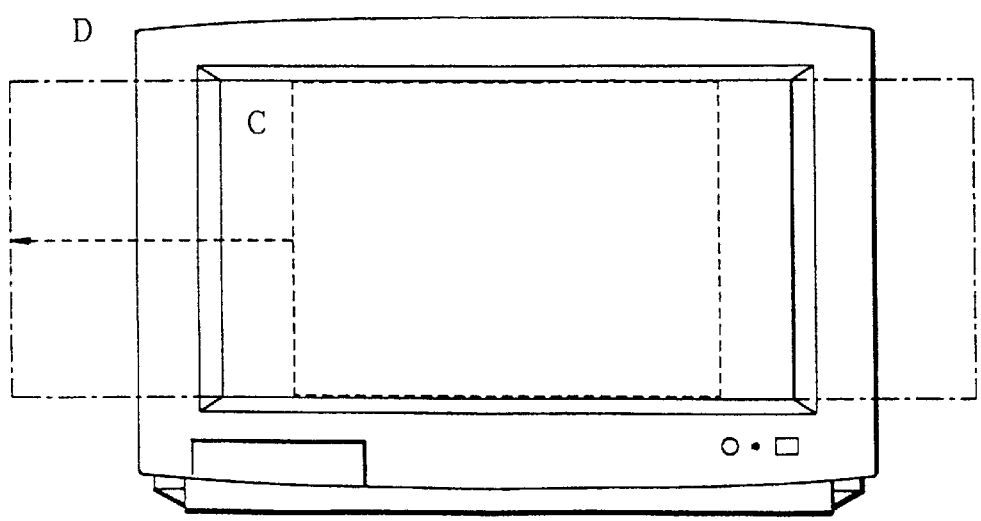
FIG. 6 illustrates the reduction of the expanded wide screen size in accordance with the present invention.

For example, when the microcomputer 22 enters the third display mode wherein the expanded view mode EXPANDED is OFF then screen (A), enlarged to the maximum as shown in FIG. 5, is reduced to screen (B) in size by the screen size control program stored in the microcomputer 22. In FIG. 6, the screen size control program enlarges screen (C) to the screen (D) when the wide view mode WIDE is ON.

To control the screen size, the user has only to manipulate the switch in control button section 21 of the wide display monitor.

Such as in the present invention as described above, the screen size can be regulated by the user's pressing a key such that the screen is maintained stable according to the switching of wide view mode or expanded view mode.

It will be apparent to those skilled in the art that various modifications and variations can be made in the method of controlling the screen size of a wide display monitor according to the present invention without departing from the spirit or scope of the invention. Thus, it is intended that the present invention cover the modifications and variations of this invention provided they come within the scope of the appended claims and their equivalents.

What is claimed is:

1. A method of controlling the screen size of a wide display monitor, comprising the steps of:

determining whether to select a display mode;

selecting one of a plurality of display modes;

entering a digital-to-analog converted input level dependent upon the selected display mode;

checking whether the digital-to-analog converted input level is entered;

calculating a horizontal size digital-to-analog converted level and a vertical size digital-to-analog converted level, when it is determined that said digital-to-analog converted input level is entered; and displaying an image on the screen by controlling said screen size according to the calculated horizontal size digital-to-analog converted level and the vertical size digital-to-analog converted level.

2. The method as set forth in claim 1, wherein said step of determining whether to select a display mode comprises activating a predetermined switch on a control button panel section of said wide display monitor.

3. The method as set forth in claim 1, wherein said step of selecting one of a plurality of display modes comprises selecting one of:

an expanded view off mode and a wide view off mode;

an expanded view on mode and a wide view off mode;

an expanded view off mode and a wide view on mode; and an expanded view on mode and a wide view on mode.

4. The method as set forth in claim 3, wherein said step of entering a digital-to-analog converted input level dependent upon the selected display mode comprises:

entering a digital-to-analog converted input level between 0 and 165 when said expanded view off mode and said wide view off mode is selected;

entering a digital-to-analog converted input level between 70 and 235 when said expanded view on mode and said wide view off mode is selected;

entering a digital-to-analog converted input level between 20 and 185 when said expanded view off mode and said wide view on mode is selected; and entering a digital-to-analog converted input level between 90 and 255 when said expanded view on mode and said wide view on mode is selected.

5. The method as set forth in claim 1, further comprising a step of generating an S-character compensating value to compensate for image distortion according to the screen size.

6. A method of controlling a screen size of a wide display monitor, comprising the steps of:

selecting one of four display modes;

entering a desired digital-to-analog converted input level dependent upon the selected display mode;

checking whether the digital-to-analog converted input level is entered according to the selected the display mode;

calculating digital-to-analog converted levels for a horizontal size and a vertical size, when it is determined that said digital-to-analog converted input level is entered; and controlling said screen size according to the calculated digital-to-analog converted levels of the horizontal and vertical sizes.

7. The method as defined in claim 6, further comprising the step of returning to said step of selecting one of four display modes when it is determined that the digital-to-analog converted input level was not entered.

8. The method as defined in claim 6, wherein the digital-to-analog converted level of the horizontal size is calculated from the expression:

$$H\text{-SIZE}=H\text{size\_Level}X(165/255)+(W+E)X\ DAC\_Level$$

and the digital-to-analog converted level of the vertical size is calculated from the expression:

$$V\text{-SIZE}=V\text{size\_Level}X(236/255)+(E\ X\ DAC\_Level)$$

where the values, Hsize_Level is between 0 and 255, Vsize_Level is between 0 and 255, W is 0 or 1, E is 0 or 1 and DAC_Level is said digital-to-analog converted input level and is between 0 and 255.

9. The method as defined in claim 6, wherein said step of selecting one of four display modes comprises selecting one of:

an expanded view off mode and a wide view off mode;

an expanded view on mode and a wide view off mode;

an expanded view off mode and a wide view on mode; and an expanded view on mode and a wide view on mode.

10. The method as defined in claim 8, wherein said value E corresponds to an expanded view mode and said value W corresponds to a wide view mode and said step of selecting one of four display modes comprises selecting one of:

an expanded view off mode where E is equal to 0 and a wide view off mode where W is equal to 0;

an expanded view on mode where E is equal to 1 and a wide view off mode where W is equal to 0;

an expanded view off mode where E is equal to 0 and a wide view on mode where W is equal to 1; and an expanded view on mode where E is equal to 1 and a wide view on mode where W is equal to 1.

11. The method as defined in claim 10, wherein said DAC_Level is between 0 and 165 when said selected one of said four display modes is said expanded view off mode where E is equal to 0 and said wide view off mode where W is equal to 0.

12. The method as defined in claim 10, wherein said DAC_Level is between 70 and 235 when said selected one of said four display modes is said expanded view on mode where E is equal to 1 and said wide view off mode where W is equal to 0.

13. The method as defined in claim 10, wherein said DAC_Level is between 20 and 185 when said selected one of said four display modes is said expanded view off mode where E is equal to 0 and said wide view on mode where W is equal to 1.

14. The method as defined in claim 10, wherein said DAC_Level is between 0 and 165 when said selected one of said four display modes is said expanded view on mode where E is equal to 1 and said wide view on mode where W is equal to 1.

15. The method as set forth in claim 6, further comprising a step of determining whether to select a display mode by activating a predetermined switch on a control button panel section of said wide display monitor.

16. A method of controlling the screen size of a wide display monitor, comprising the steps of:

determining whether to select a display mode;

selecting one of a plurality of display modes;

entering a digital-to-analog converted input level dependent upon the selected display mode;

checking whether the digital-to-analog converted input level is entered;

calculating a horizontal size digital-to-analog converted level and a vertical size digital-to-analog converted level, when it is determined that said digital-to-analog converted input level is entered;

generating an S-character compensating value to compensate for image distortion; and displaying an image on the screen by controlling said screen size according to the calculated horizontal size digital-to-analog converted level, the vertical size digital-to-analog converted level and the S-character compensating value.

17. The method as defined in claim 16, wherein the digital-to-analog converted level of the horizontal size is calculated from the expression:

$$H\text{-SIZE}=H\text{size\_Level} X (165/255)+(W+E) X \ DAC\_\text{Level}$$

and the digital-to-analog converted level of the vertical size is calculated from the expression:

$$V\text{-SIZE}=V\text{size\_Level} X (236/255)+(E \ X \ DAC\_\text{Level})$$

where the values, Hsize_Level is between 0 and 255, Vsize_Level is between 0 and 255, W is 0 or 1, E is 0 or 1 and DAC_Level is said digital-to-analog converted input level and is between 0 and 255.

18. The method as set forth in claim 16, wherein said step of selecting one of a plurality of display modes comprises selecting one of:

an expanded view off mode and a wide view off mode;

an expanded view on mode and a wide view off mode;

an expanded view off mode and a wide view on mode; and an expanded view on mode and a wide view on mode.

19. The method as set forth in claim 17, wherein said step of entering a digital-to-analog converted input level dependent upon the selected display mode comprises:

entering a digital-to-analog converted input level between 0 and 165 when said expanded view off mode and said wide view off mode is selected;

entering a digital-to-analog converted input level between 70 and 235 when said expanded view on mode and said wide view off mode is selected;

entering a digital-to-analog converted input level between 20 and 185 when said expanded view off mode and said wide view on mode is selected; and entering a digital-to-analog converted input level between 90 and 255 when said expanded view on mode and said wide view on mode is selected.

* * * * *